No. 884,343. PATENTED APR. 7, 1908.
H. N. ROCHE.
ELECTRIC WATER HEATER.
APPLICATION FILED MAR. 28, 1907.
2 SHEETS—SHEET 1.
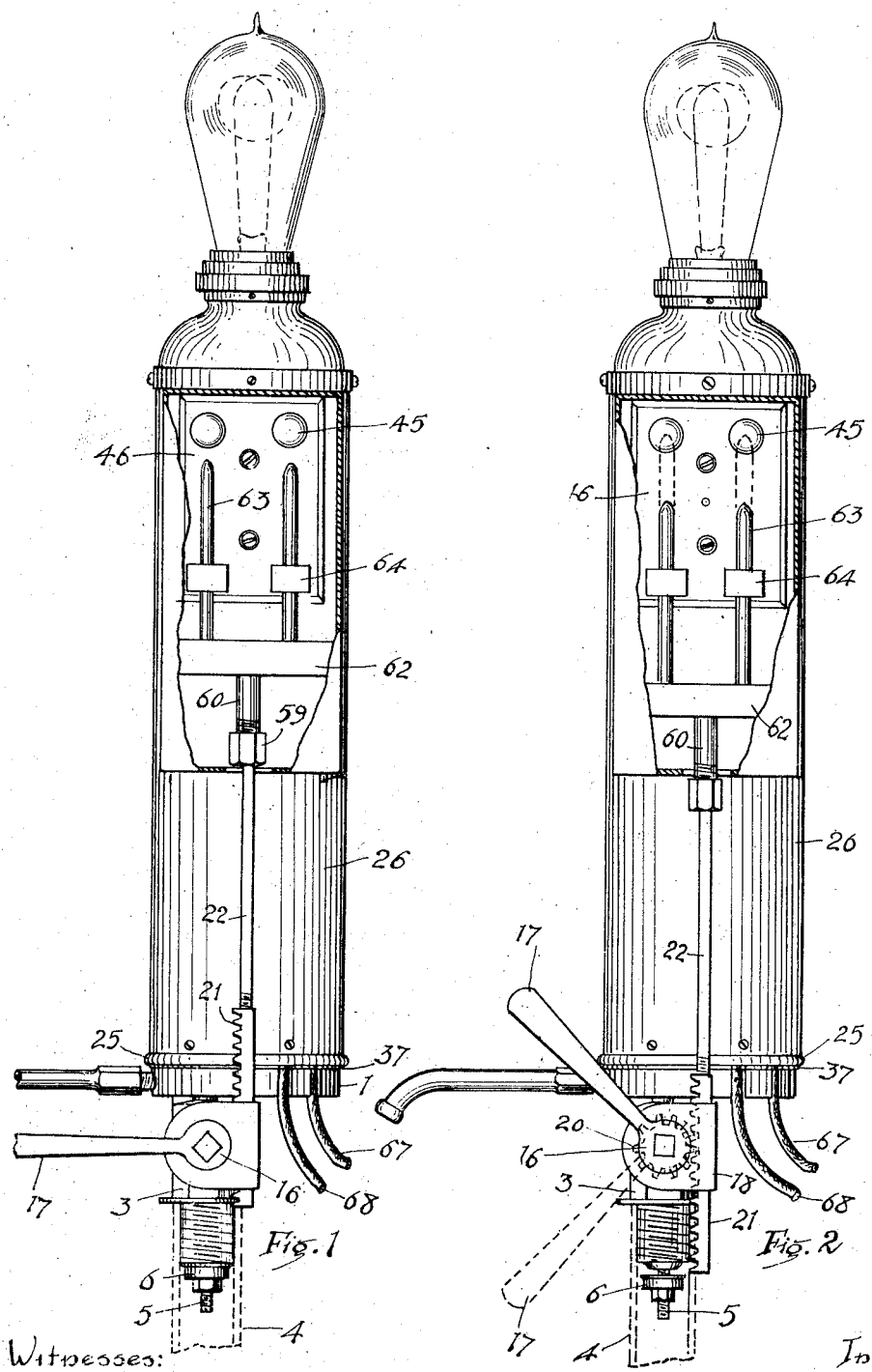
Witnesses:
Geoffrey Hall
C. L. Howe
Inventor,
H. N. Roche,
By J. M. Wright,
Attorney.

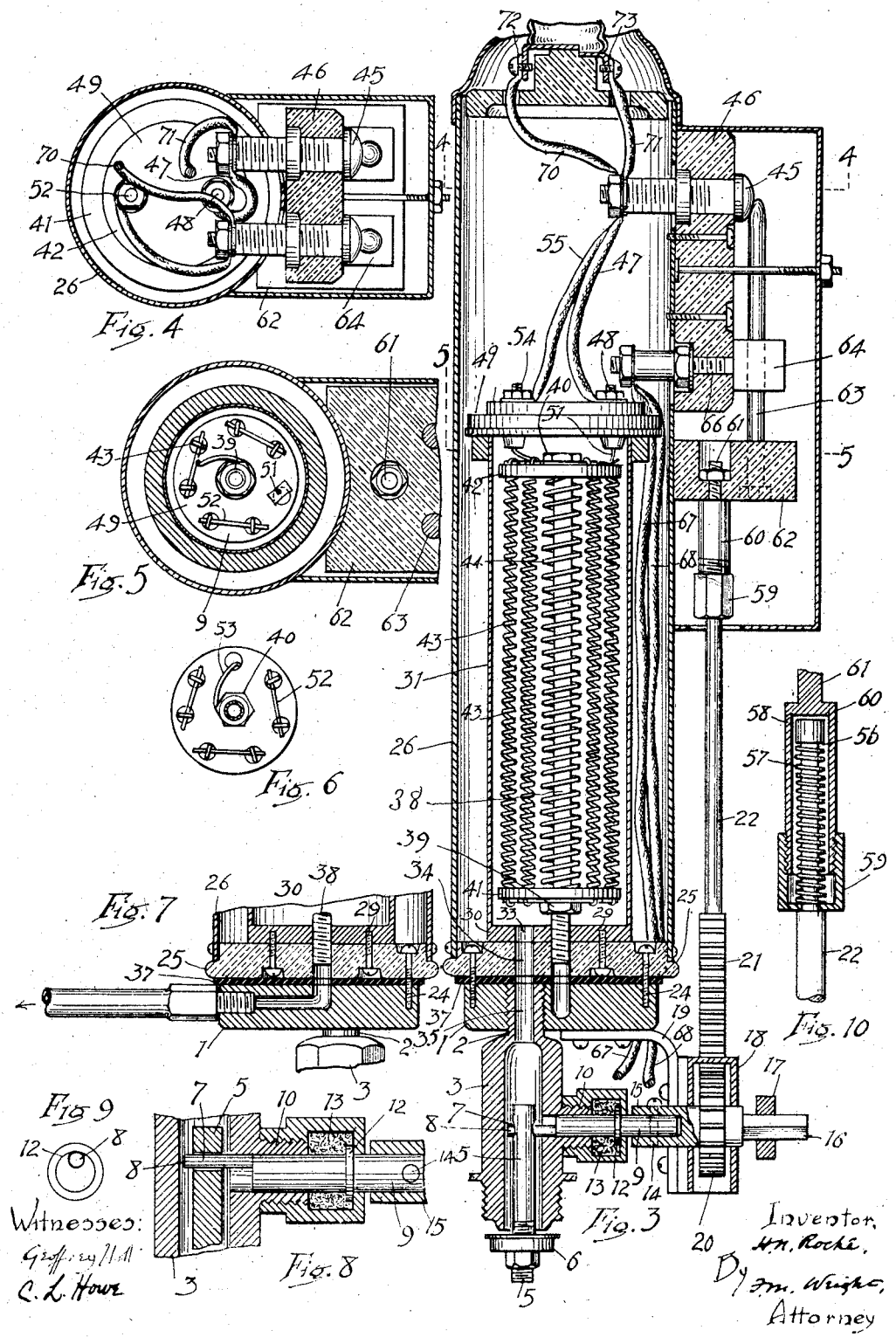

UNITED STATES PATENT OFFICE.

HERBERT N. ROCHE, OF SAN FRANCISCO, CALIFORNIA, ASSIGNOR OF ONE-HALF TO THOMAS B. GRAY, OF SAN FRANCISCO, CALIFORNIA.

ELECTRIC WATER-HEATER.

No. 884,343.  Specification of Letters Patent.  Patented April 7, 1908.

Application filed March 28, 1907. Serial No. 365,192.

*To all whom it may concern:*

Be it known that I, HERBERT N. ROCHE, a citizen of the United States, residing at San Francisco, in the county of San Francisco, and State of California, have invented new and useful Improvements in Electric Water-Heaters, of which the following is a specification.

This invention relates to instantaneous electric water heaters, the object of the invention being to provide a device of this character which shall be compact in form, simple in construction, capable of easy inspection and repair, and which can be operated to deliver water without using the heating apparatus, that is, to deliver cold water when desired, with which it will be impossible to turn on the electric current without at the same time turning on the water, and with which the breaking of the electric circuit may be made instantaneously.

In the accompanying drawings, Figure 1 is a broken side view of the apparatus, showing the parts in the position of disuse; Fig. 2 is a similar view showing the parts in the position when used for delivering cold water and also showing, in dotted lines, the position of the parts when used for delivering hot water; Fig. 3 is an enlarged vertical section of the apparatus, transverse to Fig. 1; Fig. 4 is a horizontal section on the line 4—4 of Fig. 3; Fig. 5 is a horizontal section of the water heating chamber on the line 5—5 of Fig. 3; Fig. 6 is a bottom plan view of the support for the heating coils; Fig. 7 is a broken vertical section, transverse to that shown in Fig. 3; Fig. 8 is an enlarged longitudinal section through the valve operating mechanism, showing the parts in the position when the valve is closed; Fig. 9 is an end view of the shaft for operating the valve; Fig. 10 is an enlarged longitudinal section of the spring connection of the switch stem.

Referring to the drawing, 1 indicates a suitable base into which is screwed a neck 2 of the valve casing 3, the lower end of said casing being screwed into a water supply pipe 4. In said casing is a valve stem 5, carrying at its lower end a valve 6. The upper end of said valve stem has a transverse perforation 7, through which passes a pin 8, extending eccentrically from the end of a valve rod 9, which passes through a right-angled extension 10 from the valve casing. Said rod has formed thereon a collar 12, and around said collar and rod is a stuffing gland 13, which is screwed on to the right angled extension. The outer end of said rod is secured by a screw 14 in a socket 15 of a shaft 16, which carries on its outer end a handle 17. Said shaft passes through a casing 18 attached by a bracket 19, to the bottom of the base 1 and within said casing, secured to said shaft is a pinion 20, which meshes with a rack 21, formed on the lower end of a switch stem, 22.

Upon the base 1 is secured by screws 24 the lower head 25, of porcelain or other insulating material, of the heater casing 26, and secured to said head by countersunk screws 29 is the lower end 30 of the water casing 31. Said end 30 and the head 25, are formed with apertures 33 and 34 registering with each other and with the perforation 35 of the valve casing, and there is also interposed between the base 1 and the head 25 a rubber gasket 37, also having an aperture corresponding with the aperture in the valve casing. In this way the water, when admitted to the valve casing by the opening of the valve, can flow into the interior of the water casing.

Screwed into the center of the lower end 30 of the water casing, and also into the porcelain head 25, is a central tube 38, upon which are secured by means of nuts 39 and 40, lower and upper plates 41 and 42 of insulating material. Between said heads extend a number of heating coils 43, and around said central tube 38 also extends a heating coil 44. The electric current passes through said heating coils in the following manner. From one of the contact screws 45 of the switch plate 46, a wire 47 leads to a binding screw 48 on the upper head 49 of the water casing, thence the current passes by a wire 51 to one of the coils 43, thence alternately down and up said coils in succession, the connections being made at the ends by means of short rods 52 connected thereto, the end of the last coil of the series being connected, as shown at 53, to the central coil 44, thence to the top of said coil, said coil being spaced from the tube 38, thence to the other binding post 54 in the upper head 49 of the water casing, and thence by a wire 56 to the other screw contact of the switch. The circuit between these contacts is closed only when the valve is open, in the following manner. The switch stem 22 has an extension 55 reduced in diameter, around which is a coiled spring 57 compressed between a head 58 on said extension and a thimble 59 screwed on the end of a tube 60, the upper end of which is secured by a stem 61 to a sliding block 62 of insulating material, which carries contact rods 63 which slide through blocks 64 secured on the end of screws 66, the inner ends of which screws are connected with the main wires 67, 68. When said switch is moved upwards in opening the valve, the ends of the rods 63 are adapted to contact with the heads of the contact screws 45, thus closing the circuit from the mains to said contact screws.

From the same screws lead wires, 70, 71, in parallel to the terminals 72, 73, of an electric lamp, so that a small part of the current passes through said lamp whenever the circuit is closed through the heating coils, thus apprising the operator that the device is being used to furnish hot water.

From the above description it will be readily seen that this device can be used to furnish either hot or cold water, as may be desired. Fig. 1 shows the parts in the position in which the valve is closed, the handle being then in its midway position. On moving the handle upwards into the position shown in full lines in Fig. 2, the valve is opened and the contact rods 63 move away from the heads of the contact screws, so that the circuit remains open. But upon moving the handle downwards from its midway position into the position shown in dotted lines in Fig 2, which is the same as that shown in Fig. 3, the rods 63 are moved into contact with the heads of the screws 45 and the circuit is closed, so that the heating of the water commences at the same time the valve is opened to admit of the passage of water through the device. Evidently it is impossible for the circuit to be closed and the heating coils to be heated without water passing thereover, so that the danger of overheating and burning out said wires is avoided.

In many places it is required by municipal ordinance that electric circuits shall be made with a "snap" so that it is impossible for the contact points to remain in such a position as to permit continued formation of an electric arc between said points. It is to accomplish this result that the switch stem is made with the spring terminal, illustrated more particularly in Fig. 10. By means of this construction the contact rods are, by their friction and great pressure against the heads of the contact screws, prevented from moving downwards with the switch stem until, by the downward movement of the latter, the spring 57 has become compressed to such a degree that, upon overcoming said friction, the contact rods move downwards with a spring, thus breaking the circuit instantaneously. It is also to be noted that this circuit is broken not in one place only, but in two, thereby rendering it practically impossible for the circuit to be closed accidentally as might be the case if the break was made at a single point only.

I claim:—

In an apparatus of the character described, the combination of a casing, a water conduit therein, an electric heating coil in said conduit, a valve for controlling the passage of water through said conduit, and means for connecting said heating coil with an electric circuit, comprising a stationary contact, a slidable rod contacting with a second contact and adapted to be moved into contact with the first contact and to be pressed thereon to provide a frictional resistance against the removal of said slidable rod from said contact, a stem for so moving said slidable rod, and a resilient connection between said stem and rod, substantially as described.

In testimony whereof I have hereunto set my hand in the presence of two subscribing witnesses.

HERBERT N. ROCHE.

Witnesses:
 F. M. WRIGHT,
 D. B. RICHARDS.